United States Patent [19]

Whitesides, Jr.

[11] 4,345,427
[45] Aug. 24, 1982

[54] ROCKET MOTOR OR GAS GENERATOR HAVING CONTROLLED THRUST OR MASS FLOW OUTPUT

[75] Inventor: Roger H. Whitesides, Jr., Somerville, Ala.

[73] Assignee: Thiokol Corporation, Newtown, Pa.

[21] Appl. No.: 88,706

[22] Filed: Oct. 26, 1979

[51] Int. Cl.³ ............................................... F02K 9/26
[52] U.S. Cl. ...................................... 60/234; 60/254; 60/255
[58] Field of Search ............... 60/234, 254, 255, 39.47

[56] References Cited

U.S. PATENT DOCUMENTS

| | | | |
|---|---|---|---|
| 2,733,568 | 2/1956 | Dickinson | 60/255 |
| 2,957,309 | 10/1960 | Kobbeman | 60/35.6 |
| 2,986,001 | 6/1961 | Green | 60/35.6 |
| 3,009,385 | 11/1961 | Burnside | 60/255 |
| 3,108,433 | 10/1963 | De Fries et al. | 60/35.6 |
| 3,381,476 | 5/1968 | Glick | 60/254 |
| 3,392,524 | 7/1968 | Caveny | 60/234 |
| 3,407,595 | 10/1968 | Peterson | 60/39.47 |
| 3,630,028 | 12/1971 | Caveny | 60/234 |
| 3,672,170 | 6/1972 | Chappell et al. | 60/255 |
| 3,713,395 | 1/1973 | Carpenter | 60/255 |
| 3,919,841 | 11/1975 | Panella | 60/255 |

*Primary Examiner*—Robert E. Garrett
*Attorney, Agent, or Firm*—William R. Wright, Jr.; Gerald K. White

[57] ABSTRACT

A solid propellant rocket motor of gas generator of the type having retractable filaments embedded in the propellant for the purpose of controlling the overall thrust or mass flow output is combined with a channeled separator located between the propellant and its casing with the channels open to the combustion chamber. This results in distribution of combustion chamber pressure and temperatures over the exterior of the propellant grain so that distortion of the grain will not occur sufficiently to cause binding or sticking of the filament in their holes in the propellant nor will the holes be enlarged to cause uncontrolled burning between the filament and the hole.

2 Claims, 3 Drawing Figures

ROCKET MOTOR OR GAS GENERATOR HAVING CONTROLLED THRUST OR MASS FLOW OUTPUT

BACKGROUND OF THE INVENTION AND DISCUSSION OF THE PRIOR ART

Solid propellant rocket motors or gas generators of the end or "cigarette" burning type wherein only the exposed face of the propellant burns are commonly used in the aerospace field of activity and perform very satisfactorily for many different propulsion applications. They are useful where a substantially constant burning rate of the propellant is not objectionable and can be tolerated. In some instances, however, it is important that the burning rate of the propellant be controlled to some extent over the rate of normal end burning, such as in the event of a motor for a programmed missile where the amount of thrust developed by the rocket motor may need to be increased or decreased back to normal burning thrust in order for the missile to follow its intended path of flight.

One way which has been proposed to achieve such a purpose is shown in the United States patent to Glick et al U.S. Pat. No. 3,381,476 wherein filaments or wires are embedded in the propellant of an end burning rocket motor during its construction and are adapted to be pulled away, during motor operation, from the burning face at a rate greater than the rate of burning of the propellant, thus producing a hole where the filament has vacated and thus exposing more propellant to burning than was previously available at the end face. This exposed propellant then burns in addition to that which is burning at the propellant end face, the total burning rate is increased and more combustion gases are produced resulting in more thrust or mass flow output by the rocket motor. Conversely, if the filament withdrawal rate is slowed or stopped, the filament uncovers less propellant surface in the filament hole as the end burning face "catches up" and a slower overall burning rate is achieved with less total thrust or mass flow output as a result. In other words, the thrust or mass flow produced by the end burning face of the propellant remains the same until the propellant is consumed but the amount of additional thrust or mass flow produced by burning along the filament holes up to the filament ends is controlled. In this way, a useful measure of control is achieved over the total burning rate and thrust or mass flow of the motor.

Another patent which describes filament withdrawal in an end burning solid propellant rocket motor is U.S. Pat. No. 3,630,028 to Leonard Caveny in which he not only includes filaments but also includes cutters attached to them which physically slice into the propellant in order to expose more propellant to burning in order to increase the overall burning rate.

In filament withdrawal rocket motors of the types described above, an inherent problem arises, however, in that the clearance between the filaments and the propellant needs to be very small in order to prevent burning, or what has been termed "flashback", along the wire as unwanted burning occurs due to the exposure of propellant back along the wire. On the other hand, if the clearance is made purposely very small in order to prevent flashback, any slight distortion of the propellant during motor operation is likely to cause binding or sticking of the filament in its hole and thus to interfere with proper operation of the device with resultant lack of control over the burning rate and motor thrust or mass flow output.

The present invention solves this problem by providing a separator between the propellant grain and its casing which serves a twofold purpose. In the first of these, channels are provided essentially between the casing and grain which are open to the combustion chamber and thus allowing the external pressure upon it to become substantially equal to that existing in the combustion chamber so that pressure induced distortion of the grain cannot occur to a degree which will produce either the flashback effect or binding of the filament. Secondly, the separator is made sufficiently resilient that the grain is not subject to mechanical distortions which could otherwise be of a magnitude to cause distortion of the filament holes and cause the same flashback and binding problems. Because of this structure, the filaments can be fitted closely enough to prevent flashback but will not bind because the distortion of the propellant no longer occurs to a significant degree and the filaments and their surrounding holes remain substantially straight, coaxial and unenlarged.

The U.S. Pat. No. 3,108,433 to M. G. DeFries et al is mentioned as showing a gap between the propellant grain and housing but it includes inhibiting or insulating wrappings which in themselves confine the propellant grain and may produce propellant grain distortions. This patent does not show filaments in the grain.

OBJECTS OF THE INVENTION

It is, therefore, an object of the invention to provide an end burning solid propellant rocket motor or gas generator of the type which employs retractable filaments for the purpose of controlling the overall burning rate of the propellant wherein binding or sticking of the filaments in the propellant during burning of the propellant is substantially eliminated.

It is also an object of the present invention to provide a solid propellant rocket motor or gas generator of the foregoing type wherein the propellant grain is mounted in the motor in a semi-resilient manner so that mechanical distortion of the propellant grain will not occur during the normal thermal expansion of the grain as it occurs during burning.

It is also an object of the present invention to provide a solid propellant rocket motor of the foregoing type wherein the separator's outer peripheral surface is exposed to the pressure and temperature from the combustion chamber to substantially prevent the effects of unequalized pressure and thermal distortion of the propellant grain.

It is also an object of the present invention to provide a solid propellant rocket motor or gas generator of the foregoing type wherein the propellant grain is laterally supported by a separator having a wall with pressure passages open to the combustion chamber.

Other objects and advantages of the present invention will become apparent from the description and claims which follow.

THE DRAWINGS

DETAILED DESCRIPTION OF THE INVENTION

Figure 1:
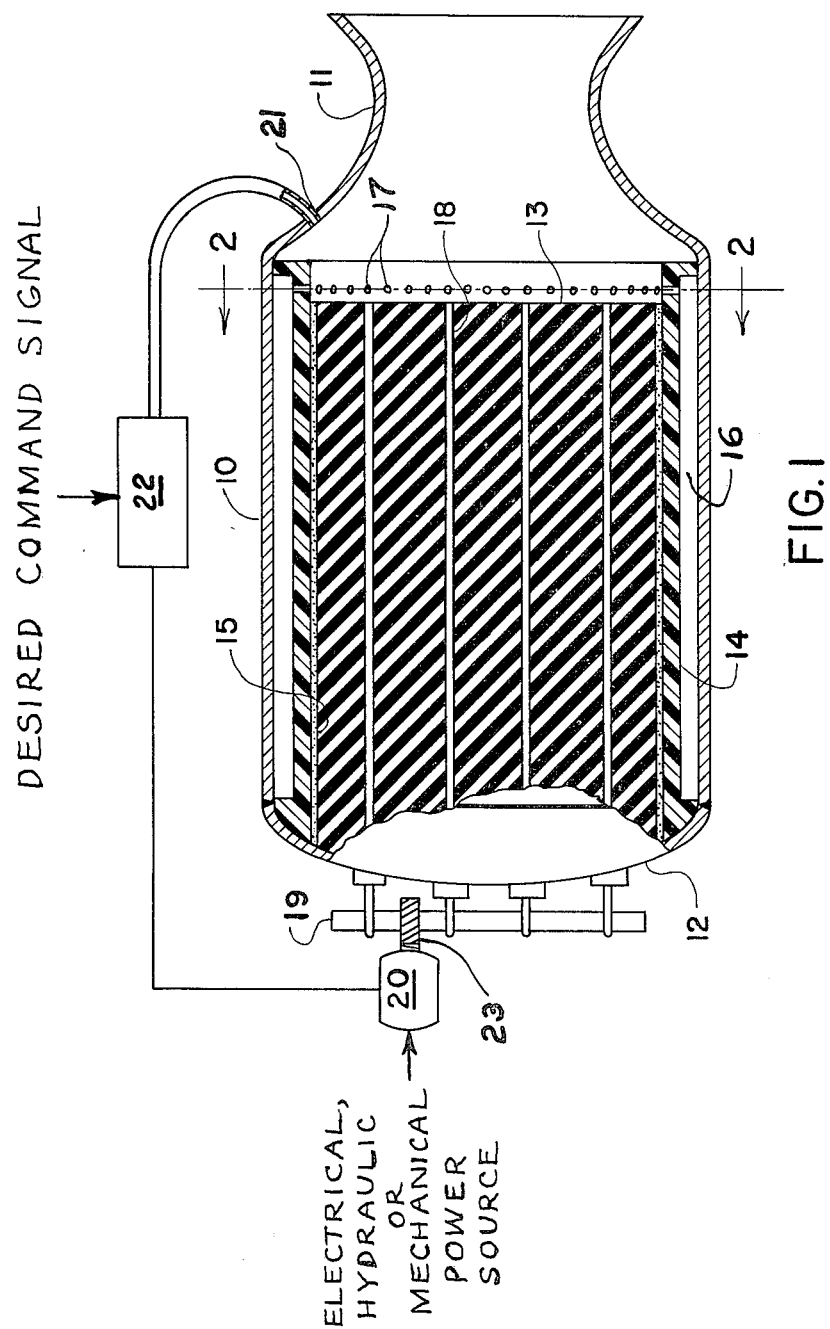
FIG. 1 is a longitudinal cross sectional view showing the propellant grain mounted in its rocket motor casing, the filaments and their withdrawal means and a schematic diagram of the control system for the retraction of the filaments through the propellant.
Figure 2:
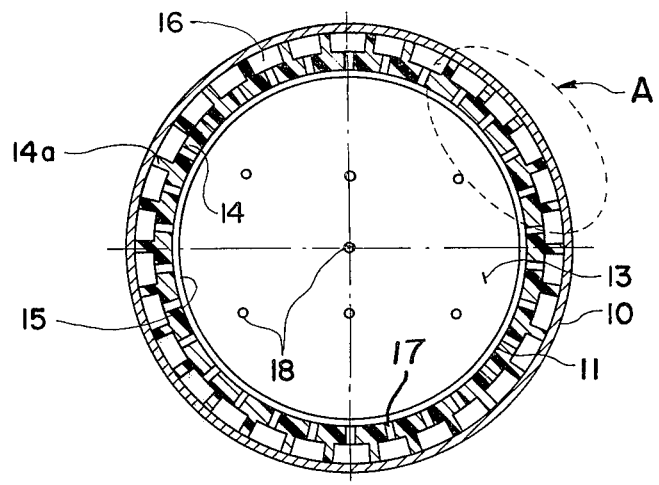
FIG. 2 is a transverse cross sectional view of the rocket motor taken at station 2—2 and looking toward the forward or closed end of the motor.
Figure 3:
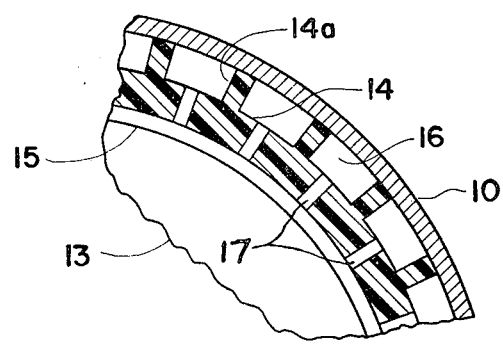
FIG. 3 is an enlarged transverse cross sectional fragmentary view of the wall of the rocket motor included within the dotted portion A indicated in FIG. 2.

In a preferred embodiment of the invention and with reference to FIG. 1 of the drawings, a rocket motor or gas generator housing or casing 10 is shown having a rocket nozzle 11 open at its after end, a closed end or head 12 and a solid propellant end burning rocket grain 13 contained within the casing 10. The propellant grain 13 is separated from the casing 10, except at head 12 where it is bonded to casing 10, by an insulating member or separator 14 made of a flexible material such as polyisoprene and is attached to it by a bonding adhesive layer 15. The separator 14 is annular in form to fit about the usual cylindrical propellant grain 13 and has a plurality of channels 16 in its outer surface which extend over its full length except for a wall at each of its ends as shown in FIG. 1 of the drawings. These channels, 16, are arranged about the outer surface of separator 14 a plurality of channels 16 being provided in each quadrant, as shown in FIGS. 2 and 3 and are longitudinal of the motor in a direction which is substantially parallel to the longitudinal central axis of the motor. At least one port 17 is provided at the aft end of each of channels 16 and is open to both the channel 16 and the combustion chamber of the motor, so as to afford free communication therebetween. As shown in FIG. 1, the channel or channels 16 extend beyond the end of grain 13 which faces the combustion chamber.

In addition to the foregoing, at least one, and preferably a plurality, of filaments 18 are embedded in the propellant grain 13 extending through it from its after surface on through the head end of the rocket motor or gas generator in the manner shown in FIGS. 1 and 2. These filaments, 18, are adapted externally or internally (not shown) of the rocket motor or gas generator to be pulled by means of a drum 19 which winds the filaments 18 on the drum at a rate determined by a control mechanism which is responsive to the extent of the thrust or mass flow output of the motor or gas generator as shown schematically in FIG. 4 and operates an electric, hydraulic or spring motor 20 which drives the drum at the appropriate filament withdrawal rate to produce the desire rate of filament withdrawal and resultant thrust or mass flow output. The filaments are ordinarily made of a plastic such as nylon, steel or of another suitable metal, plastic, or composite thereof which will not burn at its extreme end unless it is exposed to the actual burning face of the propellant where the temperature is very high.

OPERATION OF THE INVENTION

The rocket motor is started in operation by the operation of a suitable igniter (not shown) which ignites the end of the propellant grain 13 where it is exposed to the motor's combustion chamber. As burning of grain 13's face takes place, hot gases are produced which create a pressure in the combustion chamber which rises to a predetermined level and would ordinarily remain at that level throughout the consumption of the grain 13 since the burning rate would be constant. This pressure is sensed through pressure tap 21 and is transmitted to a control system 22 which compares this pressure level with the desired pressure which may be pre-programmed or transmitted from missile guidance systems, and, if the level is not high enough to satisfy the demanded thrust or mass flow level, sets electric, hydraulic, or mechanical motor 20 in operation which, through suitable worm gearing 23, turns drum 19. This action winds filaments 18 on the drum 19 and pulls them back through the propellant grain 13 somewhat. This immediately exposes more propellant grain to burning since the inner surfaces of the holes vacated by the filaments 18 are now exposed. Burning of these surfaces now occurs resulting in the formation of a conically shaped burning surface with its apex centered on the axis of the filament hole. As this additional surface burns, additional hot gases are produced, the chamber pressure level rises and more thrust or mass flow is produced as the gases pass out through nozzle 11. The control system 22 then compares the higher pressure level with the demanded level and either increases or decreases the rate of withdrawal of filaments 18 to keep the pressure level and resultant thrust or mass flow output correct. Any corrections of the thrust or mass flow output can, of course, only be made above that produced by normal burning of the flat burning face, but an important measure of control of the overall thrust or mass flow output is achieved nevertheless.

As mentioned previously in this specification, problems have arisen in motors of the type having retractable filaments in that propellant grains have been (1) confined mechanically by bonding the grain directly to the casing of the motor, and (2) the grain's exterior has been thermally and pressure isolated with respect to the temperatures and pressures encountered in the grain near the combustion chamber. The first of these produce mechanical distortion of the grain which distorts the hole through which the filament must be pulled and causes either binding and sticking of the filament in the hole or opens a gap between the filament and the surface of the hole where undesirable "flashback" burning of the grain can occur. The second of these causes mechanical distortions of the grain with similar results but with the distortions produced by unequalized distribution of the pressures and temperatures experienced by the grain.

In the present invention, however, the propellant grain 13 is separated from the motor's casing by a semi-resilient separator 14 which supports the grain 13 laterally in the casing but which is resilient enough to reduce the mechanical distortions sufficiently that the filament holes are no longer subject to sufficient distortion or change in dimension to cause sticking, binding or "flashback" burning. Furthermore, thermal and pressure distortion is reduced so that these same problems are eliminated due to thermal and pressure equalization over the grain 13. This latter is accomplished by the provision of the passages or grooves 16 in the separator and the communicating ports 17 which permit hot gases from the combustion chamber to enter passages 16 and thus subject separator 14 and the grain 13 to nearly equal temperature and pressure compared to that experienced by the burning end of grain 13.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

I claim:

1. A rocket motor or gas generator comprising in combination, a casing including a combustion chamber, a solid propellant grain mounted in said casing, a separator between said grain and the casing, a head closing one end of said casing, at least one opening at the opposite end of said casing, filaments embedded in said propellant, means adapted to retract the filaments during burning of the propellant at various rates to vary its overall burning rate, the separator including walls defining at least one channel in its surface adjacent the casing and port means allowing communication between said channel and said combustion chamber, with each channel arranged longitudinally with respect to the propellant grain, with each channel extended beyond the propellant grain, with the port means comprising at least one passage for each channel and the passage radially oriented with respect to the longitudinal central axis of the motor or gas generator, wherein said propellant grain is cylindrical in form and said separator is annular in form and fits around the cylindrical walls of said propellant grain, and wherein said channels in said separator are uniformly spaced in all four quadrants of said separator to insure a substantially uniform pressure distribution over the burning end of said propellant grain and the cylindrical walls thereof.

2. The invention set forth in claim 1 wherein said separator includes a plurality of channels in each quadrant.

* * * * *